United States Patent Office 3,123,376
Patented Mar. 3, 1964

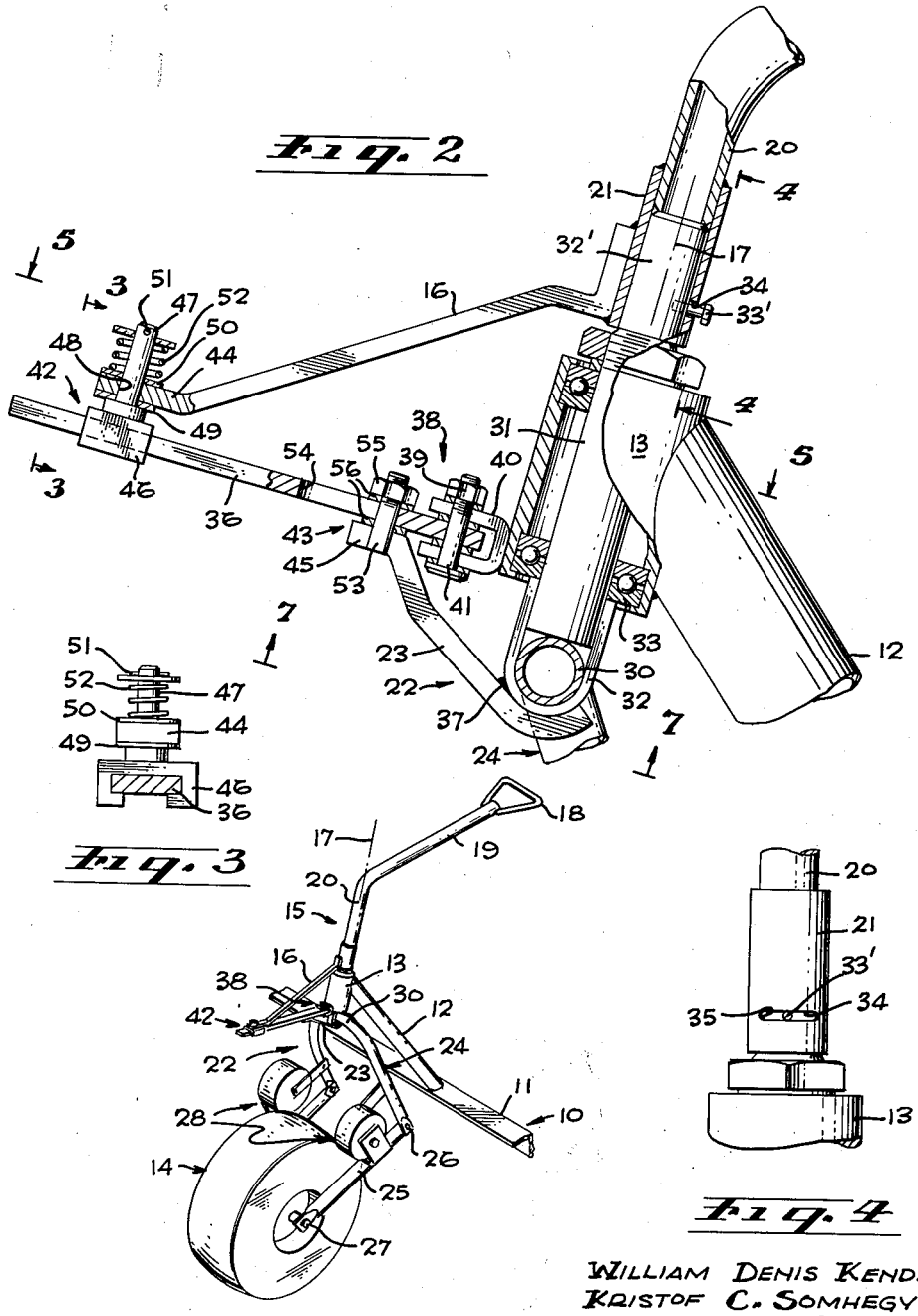

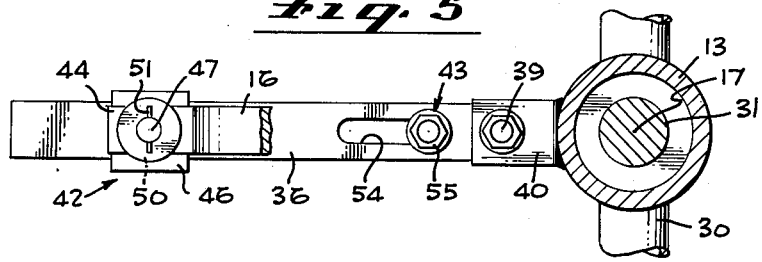
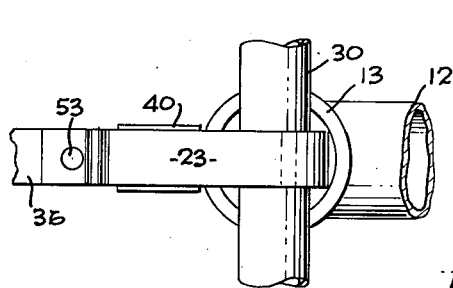
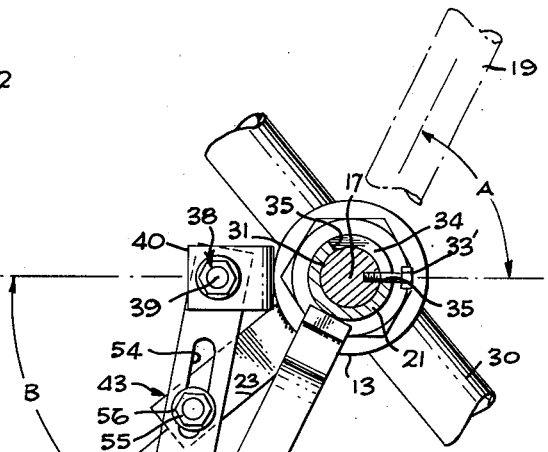
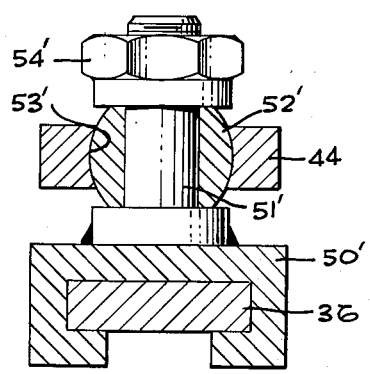
WILLIAM DENIS KENDALL
KRISTOF C. SOMHEGYI
INVENTORS

3,123,376
VEHICLE STEERING LINKAGE
William Denis Kendall, Los Angeles, and Kristof C. Somhegyi, Santa Monica, Calif., assignors, by mesne assignments, to Ray L. Boeger, Seal Beach, Calif.
Filed Aug. 20, 1962, Ser. No. 217,985
11 Claims. (Cl. 280—92)

This invention relates generally to cart steering apparatus, and more particularly concerns surprisingly simple and efficient steering structure facilitating ease of turning of a balloon size front wheel or tire for a cart.

The invention is particularly adapted to golf type carts, generally having two rear wheels and one forward steering wheel, such carts in the past not having to our knowledge the advantages associated with the steering apparatus of the present invention. Generally speaking, the improved steering assembly for the cart includes a first rotary means including a first cranking member turnable in response to operator control, a second rotary means including a second cranking member and turnable to steer the cart wheel, together with auxiliary structure for effecting turning of the second member in response to turning of the first member and at a rate slower than the rate of turning of the first member. As a result, a beneficial mechanical advantage is developed in an unusually simple manner, for turning the wheel in response to operator controlled turning of the first rotary means, the advantage typically being variable.

More specifically, and in one of its possible forms, the auxiliary structure may include thrust transmitting means intercoupling the crank members for relative rotary movement, together with means for supporting the thrust transmitting means for rotary movement relative to the crank members. Furthermore, the thrust transmitting means may be pivotally supported for turning about a fixed axis, and it may be intercoupled to the crank members at locations spaced from and turnable about the fixed axis, as will be described.

Other features and advantages of the invention include the combining of the steering structure with weight supporting bearing structure, in a highly novel an unobvious manner, thereby contributing to overall simplicity essential in a golf cart, as well as the construction of the various operative members, also contributing to overall simplicity and effectiveness.

These and other objects and advantages of the invention, as well as the details of an illustrative embodiment, will be more fully understood from the following detailed description of the drawings, in which:

FIG. 1 is a perspective showing of the steering structure, and a typical cart front wheel and frame portion;

FIG. 2 is an enlarged side elevation, partly in section, showing the steering structure;

FIG. 3 is a view taken on line 3—3 of FIG. 2;

FIG. 4 is a view taken on line 4—4 of FIG. 2;

FIG. 5 is a view, partly in section, taken on line 5—5 of FIG. 2;

FIG. 6 is a view similar to FIG. 5, but showing the steering structure turned to the left or counterclockwise;

FIG. 7 is a view taken on line 7—7 of FIG. 2; and

FIG. 8 shows a modified connection between a first cranking member and a thrust transmitting link.

Referring first to FIGS. 1 and 2, the cart will be understood as including a frame 10 typically comprising a transverse an horizontal member 11 from which a first frame member 12 projects upwardly and forwardly terminating at a bearing housing 13. The cart will also be understood as including a ground wheel 14 typically of a balloon type design for cushioning effect, it being clear that the size of the tire presents the problem of difficulty of steering due to the extent of frictional contact of the tire with the ground.

Coming now to the improved steering assembly, it may be considered as comprising first rotary means, such as that generally indicated at 15 and including a first cranking member 16, all of which is turnable about the axis 17 in response to operator control. Such control is exemplified in one form by the handle 18 attached to the arm 19 having a stem 20 which projects downwardly and forwardly at a slight angle with respect to vertical, in alignment with the axis 17. As shown in FIG. 2, the first cranking member 16 is typically made integral with the stem 20 by attachment to a sleeve 21.

The steering assembly also includes second rotary means, generally designated at 22, and includes a second cranking member, such as is shown at 23, turnable about the axis 17 to steer the wheel 14. The second rotary means may include a fork 24 and links 25 pivotally connected to the forked legs at 26. The links straddle the wheel 14 and are connected at 27 to opposite ends of the wheel axle, whereby the wheel may pivot up and down relative to the fork 24 and about the axis of the pivot connections. Such pivoting is cushioned or resisted by structure generally designated at 28, which is described in Patent No. 3,090,638.

The upper crosspiece 30 of the fork 24 is suitably rigidly attached to a rotary post or king pin 31 as by means of a strap or other connector 32 through which thrust loading is transmitted. Bearing 33 transmits cart loading to the connector 32 from the bearing housing 13, while allowing pivoting of the pin 31 about the axis 17. Typically the pin projects upwardly through housing 13, and also projects upwardly therefrom at 32' for telescopic interfitting with the rotary sleeve 21. Rotation limiting stop means is carried by one of the first and second rotary means to engage the other of the first and second rotary means, one form of such stop means comprising the pin 33' carried by the post projection 32' to extend through a slot 34 in the sleeve 21. The extreme terminal shoulders 35 defining the angular limits of the slots are engageable by the pin 33 to limit turning of the sleeve 21 about the axis 17, in spite of rotation of both sleeve 21 and projection 32.

The second rotary means is turnable in response to turning of the first rotary means, and at a rate slower than the rate of turning of the first rotary means, in accordance with the invention. This relationship provides a mechanical advantage for turning the wheel 14 in response to operator controlled turning of the handle 18 about the axis 17. Typically, the highly efficient and simple auxiliary structure turns the second crank member in response to turning of the first cranking member, such structure including a thrust transmitting means, as for example comprises a link 36 intercoupling the cranking members 16 and 23 for relative rotary movement. The auxiliary structure also includes means supporting the thrust transmitting link 36 for rotary movement relative to members 16 and 23. In this regard, the member 23 is rigidly attached to the connector 32, as for example is shown at 37 in FIG. 2.

More specifically, the thrust transmitting link 36 is pivotally supported as shown at 38 for turning about a first axis 39 which is forwardly spaced from and parallel to the axis 17. Typically, the pivotal support 38 may include a U shaped member 40 and a post or pin 41 pivotally retaining a portion of the link 36 between the legs of the member 40. Also, the link 36 is intercoupled to the crank members 16 and 23 at the locations 42 and 43 which are spaced from and turnable about the first axis 39.

As shown in the drawings, the thrust transmitting means is intercoupled by lost motion type connectors with the crank members at the locations 42 and 43, and typically, the connectors allow relative motion of the crank terminals 44 and 45 along the link 36 during turning of the cart wheel 14. The connection at the location 42 is shown to comprise a slider 46 movable along the link 36, and attached to the terminal 44 of the first crank 16 as by means of a slider supported post or pin 47 projecting upwardly through the crank terminal at 48. Suitable washers are shown at 49, 50 at opposite sides of the crank terminal 44. A pin 51 on the post 47 confines a compression spring 52 to urge terminal 44 toward the slider 46. The connection 43 typically includes a post or pin 53 carried by the terminal 45 of the second crank 23, the post extending through a lengthwise slot 54 in the link 36. A nut 55 on the threaded end of the post 53 confines a pair of slippers 56 between the nut and the terminal 45 for bearing engagement with opposite sides of the link 36.

Reference to FIG. 6 will show that the first rotary means including the crank 16 has been turned through an angle A when the second rotary means including the crank member 23 has been rotated through an angle B, corresponding to the degree of turning of the wheel 14 as indicated by the center line 60 of the tire. A vertical plane through the center line 60 also passes lengthwise through the second crank member 23. Since the angle A is considerably larger than the angle B, it is clear that a considerable mechanical advantage exists, or is developed, for turning the wheel in response to separate control turning of the first crank 16. In this regard, the pin 33 in FIG. 6 is shown in engagement with one of the shoulders 35 at the angular limits of the slot 34, thereby preventing further turning of the wheel.

Furthermore, it will be understood that the mechanical advantage or steering ratio decreases as the angle A increases, and conversely that the mechanical advantage is greater at smaller values of angle A. Accordingly, the operator tends to return the front wheel to a straight forward steering direction after making a turn.

Finally, FIG. 8 shows a different connection equivalent to that illustrated at the location 42 in FIG. 2. In FIG. 8 the slider 50' on the link 36 supports a post or pin 51' which supports a ball 52. A socket 53' in the terminal 44 of the first cranking member 16 fits the ball 52', thereby providing a pivot connection which compensates for any out-of-parallel as respects axes 39 and 17, about which the members 36 and 16 turn. A nut 54' on the post 51 holds the assembly together.

We claim:

1. In combination with a cart including a frame and a ground wheel, an improved steering assembly comprising bearing structure carried by the frame to have a generally upright bearing axis, first rotary means including a first cranking member turnable about said axis and projecting outwardly therefrom near said bearing structure, said first rotary means including an operator control, second rotary means including a second cranking member turnable about said axis to steer the wheel and projecting outwardly from said axis near said bearing structure, said bearing structure supporting at least one of said first and second rotary means, and thrust transmitting auxiliary structure including lost motion connections for effecting turning of said second member in response to turning of said first member and at a rate slower than the rate of turning of said first member, whereby a mechanical advantage is developed for turning said wheel in response to operator controlled turning of said first rotary means.

2. The invention as defined in claim 1 in which said auxiliary structure includes thrust transmitting means intercoupling said crank members for relative rotary movement and arm means integral with the bearing housing structure supporting said thrust transmitting means for rotary movement relative to said crank members.

3. The invention as defined in claim 2 in which said thrust transmitting means is pivotally supported for turning about a fixed axis, and is intercoupled to said crank members at locations spaced from and turnable about said fixed axis.

4. The invention as defined in claim 3 in which said fixed axis is spaced from and parallel to said bearing axis.

5. The invention as defined in claim 3 in which said thrust transmitting means has said lost motion connections with said crank members at said locations.

6. The invention as defined in claim 5 in which said thrust transmitting means includes an arm, a slider movable along said arm, and a ball and socket interconnection between said slider and said first crank member.

7. The invention as defined in claim 4 in which said thrust transmitting means is operatively coupled to said first cranking member by a ball and socket assembly.

8. The invention as defined in claim 1 in which said first and second rotary means interfit, and including turn limiting stop means carried by one of said first and second rotary means to engage the other of said first and second rotary means.

9. The invention as defined in claim 1 in which said auxiliary structure is pivoted to decrease said mechanical advantage as the degree of turn is increased.

10. The invention as defined in claim 1 in which said lost motion connections have sliding and pivotal attachment with said crank members.

11. For combination with a cart including a frame and a ground wheel, an improved steering assembly comprising first rotary means including a first cranking member and being turnable in response to operator control, second rotary means including a second cranking member and being turnable to steer said wheel, and auxiliary structure for effecting turning of said second member in response to turning of said first member and at a rate slower than the rate of turning of said first member, whereby a mechanical advantage is developed for turning the wheel in response to operator controlled turning of said first rotary means, said auxiliary structure including thrust transmitting means intercoupling said crank members for relative rotary movement and means supporting said thrust transmitting means for rotary movement relative to said crank members, said thrust transmitting means being pivotally supported for turning about a fixed axis, and being intercoupled to said crank members at locations spaced from and turnable about said fixed axis, said thrust transmitting means having lost motion connections with said crank members at said locations.

References Cited in the file of this patent

UNITED STATES PATENTS

| | | |
|---|---|---|
| 475,142 | McPherson | May 17, 1892 |
| 1,132,771 | Handy | Mar. 23, 1915 |
| 1,168,956 | Nelson | Jan. 18, 1916 |
| 2,222,904 | Heaslet | Nov. 26, 1940 |
| 2,303,568 | McWhorter et al. | Dec. 1, 1942 |
| 2,508,057 | Bishop | May 16, 1950 |
| 3,008,446 | Quayle | Nov. 14, 1961 |